(12) United States Patent
Cheng et al.

(10) Patent No.: US 9,136,713 B1
(45) Date of Patent: Sep. 15, 2015

(54) PROACTIVE AND HIGHLY EFFICIENT ACTIVE BALANCE APPARATUS FOR A BATTERY POWER SYSTEM

(71) Applicants: Win Cheng, Cupertino, CA (US); Jeff Yeu-Farn Hsieh, Los Altos, CA (US)

(72) Inventors: Win Cheng, Cupertino, CA (US); Jeff Yeu-Farn Hsieh, Los Altos, CA (US)

( * ) Notice: Subject to any disclaimer, the term of this patent is extended or adjusted under 35 U.S.C. 154(b) by 372 days.

(21) Appl. No.: 13/739,835

(22) Filed: Jan. 11, 2013

Related U.S. Application Data

(60) Provisional application No. 61/586,617, filed on Jan. 13, 2012.

(51) Int. Cl.
| | |
|---|---|
| H02J 7/04 | (2006.01) |
| H02J 7/16 | (2006.01) |
| H01M 10/50 | (2006.01) |
| H01M 2/38 | (2006.01) |
| G08B 21/00 | (2006.01) |
| H02J 7/00 | (2006.01) |
| H01M 10/60 | (2014.01) |

(52) U.S. Cl.
CPC ............... *H02J 7/0014* (2013.01); *G08B 21/00* (2013.01); *H01M 2/38* (2013.01); *H01M 10/50* (2013.01); *H02J 7/04* (2013.01); *H02J 7/16* (2013.01)

(58) Field of Classification Search
CPC ................. H02J 7/00; H02J 7/04; H02J 7/16; H01M 10/50; H01M 2/38; G08B 21/00
USPC .......................... 320/126, 150, 136, 135, 124; 340/636.18; 429/62
See application file for complete search history.

(56) References Cited

U.S. PATENT DOCUMENTS

| | | | | |
|---|---|---|---|---|
| 5,641,587 | A | * | 6/1997 | Mitchell et al. ................. 429/90 |
| 5,744,936 | A | * | 4/1998 | Kawakami .................... 320/120 |
| 5,831,350 | A | * | 11/1998 | McConkey et al. ............ 307/150 |
| 7,516,726 | B2 | * | 4/2009 | Esaka et al. ................. 123/179.3 |
| 8,963,501 | B2 | * | 2/2015 | Shigemizu et al. ............ 320/126 |
| 8,980,492 | B2 | * | 3/2015 | Marsh et al. .................. 429/431 |
| 9,030,167 | B2 | * | 5/2015 | Yamaguchi et al. .......... 320/119 |
| 9,048,669 | B2 | * | 6/2015 | Lim et al. ............................ 1/1 |
| 2007/0145950 | A1 | * | 6/2007 | Wang ............................ 320/134 |
| 2009/0033282 | A1 | * | 2/2009 | Ishikawa et al. .............. 320/122 |
| 2009/0102434 | A1 | * | 4/2009 | Nakajima et al. ............. 320/166 |
| 2010/0261048 | A1 | * | 10/2010 | Kim et al. ...................... 429/150 |
| 2010/0283433 | A1 | * | 11/2010 | Oh et al. ........................ 320/162 |
| 2011/0309797 | A1 | * | 12/2011 | Ciampolini ................... 320/118 |
| 2012/0086390 | A1 | * | 4/2012 | Lim et al. ...................... 320/107 |

(Continued)

OTHER PUBLICATIONS

Li H et al., Chinese Document N. CN 1819395 A, 3 pages containing front page and drawing, pulibshed Aug. 16, 2006.*

*Primary Examiner* — Phallaka Kik
(74) *Attorney, Agent, or Firm* — Plager Schack LLP

(57) ABSTRACT

An apparatus for actively balancing a cell group in a battery power system comprises a main cell unit further comprising a first local cell module and a second local cell module in parallel creating a parallel cell module. The main cell unit is electrically coupled to a system control unit and the system control unit is communicatively coupled to the first local cell module and the second local cell module. A compensation cell and a power switch unit is communicatively connected to the main cell unit and communicatively connected to the system control unit. The compensation cell and the power switch unit further comprise a plurality of compensation cells. The plurality of compensation cells is paired with the parallel cell module to become the cell group with optimized total capacity.

6 Claims, 3 Drawing Sheets

(56) References Cited

U.S. PATENT DOCUMENTS

2013/0141828 A1* 6/2013 Yamaguchi et al. ............ 361/86
2013/0200860 A1* 8/2013 Takeda et al. ................. 320/167
2013/0293163 A1* 11/2013 Flett .............................. 318/139

* cited by examiner

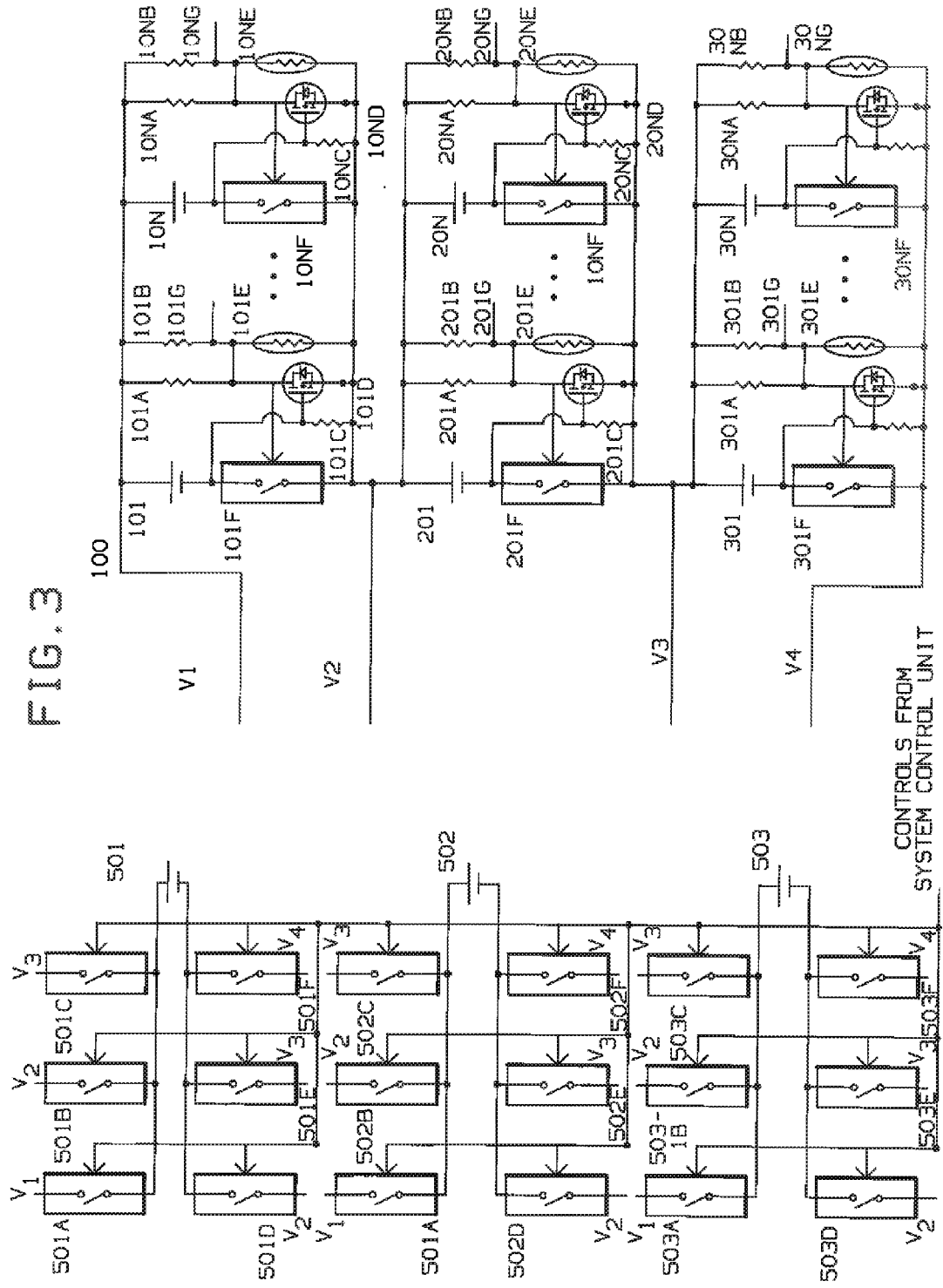

PROACTIVE AND HIGHLY EFFICIENT ACTIVE BALANCE APPARATUS FOR A BATTERY POWER SYSTEM

CROSS REFERENCE TO RELATED APPLICATIONS

This application claims priority to U.S. Provisional Application 61/586,617 filed on Jan. 13, 2012.

FIELD OF THE INVENTION

This invention relates to direct current (D.C.) circuits powered by batteries. It provides an apparatus for balancing and protecting the cells in a battery power system.

BACKGROUND OF THE INVENTION

Current active balance methods for Battery Management System (BMS) require complicated control and balance circuitry. During the balance process, power must be converted and transferred from a single cell or a group of cells to other group of cells or selected single cell. This process results in significant conversion loss. Further, the circuitry consumes power during standby and operation mode. The circuitry also increases the component count, size and cost. Thus, system reliability and battery life are also reduced.

Prior art solutions to this problem are more elaborate controls that drain more energy exacerbating the problem. See, Balog, R.S., *Autonomous Local Control in Distributed DC Power Systems* (University of Illinois at Urbana-Champaign, 2006).

BRIEF SUMMARY OF THE INVENTION

An apparatus for actively balancing a cell group in a battery power system comprises a main cell unit further comprising a first local cell module and a second local cell module in parallel creating a parallel cell module. The main cell unit is electrically coupled to a system control unit and the system control unit is communicatively coupled to the first local cell module and the second local cell module. A compensation cell and a power switch unit is communicatively connected to the main cell unit and communicatively connected to the system control unit. The compensation cell and the power switch unit further comprise a plurality of compensation cells. The plurality of compensation cells is paired with the parallel cell module to become the cell group with optimized total capacity.

A method for actively balancing a cell group in a battery power system comprises coupling a system control unit to a main cell unit. The main cell unit further comprises a first local cell module and a second local cell module such that the system control unit can communicate with the first local cell module and the second local cell module. The user then couples a compensation cell and a power switch unit to the main cell unit and the system control unit such that the compensation cell can communicate with the system control unit where the compensation cell further comprises a plurality of compensation cells. The system control unit rates the compensation cell and a total battery capacity of the main cell unit and storing this stored rating in the system control unit. The system control unit then pairs each compensation cell with each local cell module based on the stored rating in the system control unit.

BRIEF DESCRIPTION OF THE SEVERAL VIEWS OF THE DRAWINGS

Figure 1:
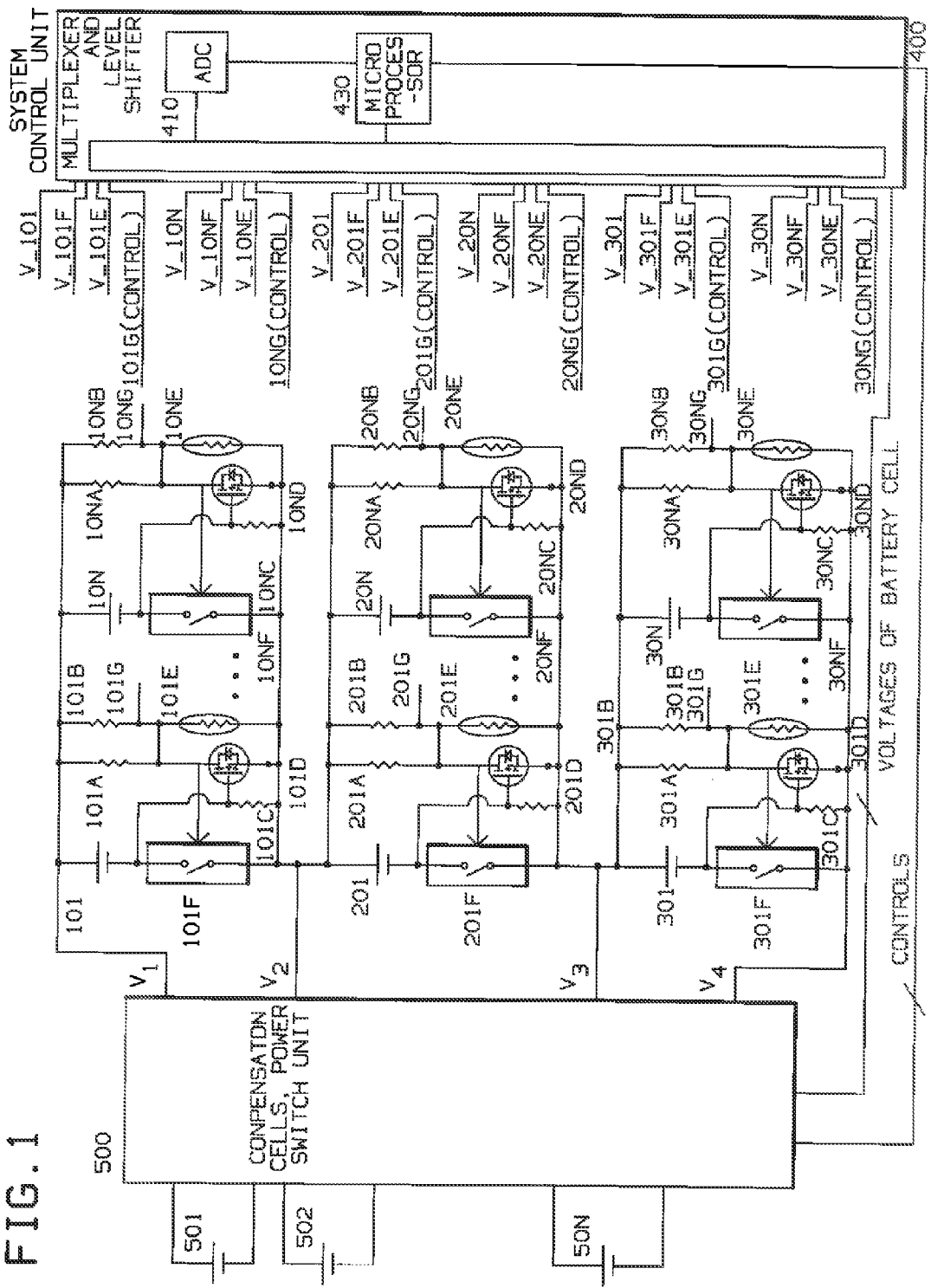

Having thus described the invention in general terms, reference will now be made to the accompanying drawings, which are not necessarily drawn to scale, and wherein:

FIG. 1 is a system diagram of the invention.

Figure 2:
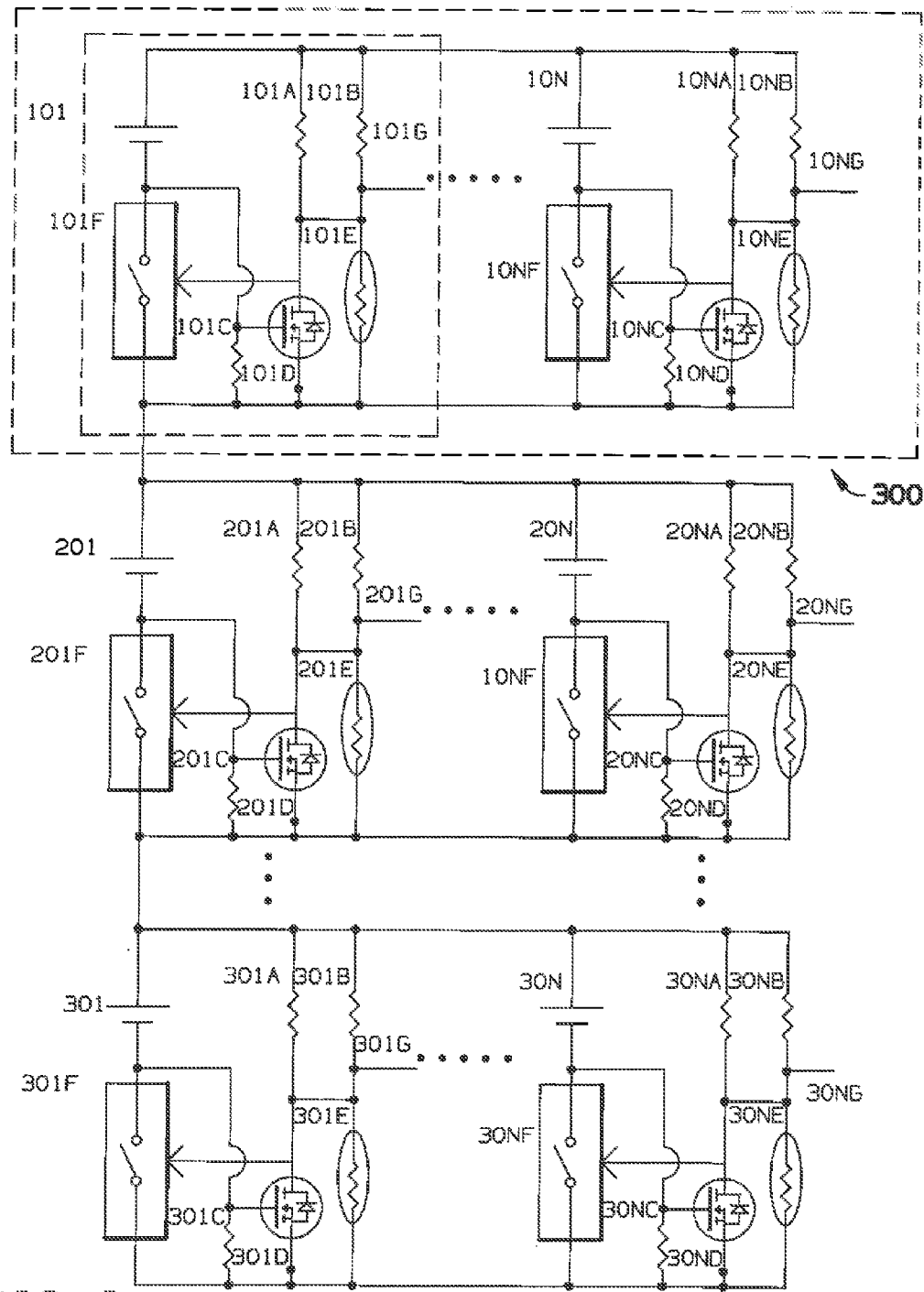

FIG. 2 is a detail cell module diagram of the invention.

FIG. 3 a compensation cells diagram view of the invention.

DETAILED DESCRIPTION OF THE INVENTION

Embodiments of the present invention overcome many of the obstacles associated with balancing battery power systems, and now will be described more fully hereinafter with reference to the accompanying drawings that show some, but not all embodiments of the claimed inventions. Indeed, the invention may be embodied in many different forms and should not be construed as limited to the embodiments set forth herein. Rather, these embodiments are provided so that this disclosure will satisfy applicable legal requirements. Like numbers refer to like elements throughout.

FIG. 1 shows battery power system 10. Battery power system 10 comprises a plurality of local cell modules 101 in FIG. 2 which are put in parallel into a plurality of local cell modules 300 (which are shown in more detail in FIG. 2) which are then serialized into main cell unit 100. Main cell unit 100 is electrically coupled to system control unit 400 by a plurality of input/output pins. Main cell unit 100 is also electrically coupled to compensation cell & power switch unit 500.

System control unit 400 comprises Analog Digital Converter (ADC) 410, multiplexers 420 and micro-controller 430. In real world application, Analog Digital Converter 410 and multiplexer 420 can be integrated into microcontroller 430. System control unit 400 is communicatively coupled to each local unit 300 and power unit 500 such that System control unit 400 monitors all cell voltages, charging currents, and temperatures. System control unit 400 digitizes this information and provides an analysis of all the cell capacity and health by using micro-controller 430.

FIG. 2 shows local cell module 101. Local cell module 101 comprises battery cell BAT_101, power switch 101F, temperature sensor 101E and control circuitry 101X. Control circuitry 101X further comprises resister 101A, resister 101B, resister 101C and transistor 101D. The battery cell BAT_101, power switch 101F and temperature sensor 101E are communicatively coupled to system control unit 400. System control unit 400 monitors the cell voltage, current charging and temperature of each local cell module 101. Power switch 101F controlled by control circuitry 101X is used to automatically remove and isolate battery cell from the battery system if a battery has excessive self-discharge which may cause a short circuitry path. Power switch 101F can also be controlled by system control unit 400 in case of testing or other requirements. Local cell module 10N, local cell module 201, local cell module 20N, local cell module 301 and local cell module 30N all have similar configurations to local cell module 101. In actual implementation, the power switch can be implemented with a power MOSFET and related circuitry. A power MOSFET is a specific type of metal oxide semiconductor field-effect transistor (MOSFET) designed to handle significant power levels. Two or more local cell modules 101 placed in parallel forms parallel cell module 300. But in actual implementation, only one local cell module also can be used. Parallel cell module 300 comprises a first local cell module 101 electrically coupled in parallel to a second local cell module 10N. While only two local cell modules are shown, an unlimited number of modules can be used. The advantages of parallel circuits are well known, the output voltage will stay the same and the output current will increase.

One or more local cell modules 300 placed in series forms Main cell 100. Main cell 100 comprises a first local cell module 101 electrically coupled in parallel to a second local cell module 10N which is then placed in series with a third local module cell 201 electrically coupled in parallel to a fourth local cell module 20N. Third local cell module 201 and fourth local cell module 20N are the connected in series to a fifth local cell module 301 which is connected in parallel to a sixth local cell module 30N. While only six local cell modules are shown and unlimited number of modules can be used. The advantages of series circuits are well known, the output current will stay the same and the output voltage will increase.

One difficulty with battery power systems that the current invention resolves, deals with battery cells capacity being drained unevenly due to aging or other factors. It is well known that each cell in battery system must be of the same capacity, current and voltage level to operate efficiently. However, uneven battery capacity will reduce efficiency by causing unequal voltage sources to appear in a battery system. The current invention resolves this by pairing the battery cells to optimize the total group cell capacity and also isolating voltage sources in short circuits.

FIG. 3 shows how individual batteries 501, 502, and 503 in the Compensation Cells & Power Switch Unit 500 are electrically connected to form voltage sources that are electrically coupled to various local cell modules. This example uses three battery cells, but an unlimited number of compensation battery cells 501, 502, 503 can be used.

The positive terminal of compensation cell 501 is electrically coupled to power switch 501A, power switch 501B and power switch 501C. The negative terminal of compensation cell 501 is electrically coupled to power switch 501D, power switch 501E and power switch 501F. Power switch 501A, power switch 501B, power switch 501C, power switch 501D, switch power 501E and switch power 501F are communicatively coupled to system control unit 400 such that system control unit 400 can open or close power switch 501A, power switch 501B, power switch 501C, power switch 501D, power switch 501E and power switch 501F in any pattern. Power switch 501A is electrically coupled to voltage source V1. Power switch 501B is electrically coupled to voltage source V2. Power switch 501C is electrically coupled to voltage source V3. Power switch 501D is electrically coupled to voltage source V2. Power switch 501E is electrically coupled to voltage source V3. Power switch 501F is electrically coupled to voltage source V4. Compensation cell 502 and compensation cell 50N have similar configurations to compensation cell 501. In actual implementation, the power switch can be implemented with a power MOSFET and related circuitry.

System control unit 400 rates compensation cell 501, compensation cell 502 and compensation cell 50N which are monitored during charging and discharging. Similarly, system control unit 400 monitors, sums and rates the total battery capacity of local cell modules during charging and discharging. Accordingly, system control unit 400 electronically stores the capacity rating of local cell modules 300, compensation cell 501, compensation cell 502 and compensation cell 50N. At the end of the charging and discharging process, system control unit 400 pairs each compensation cell with each parallel cell module 300. This pairing makes the total group cell capacity as close as possible and will remain the same pair until a significant total cell capacity is detected. System control unit 400 has the option of choosing which of the above cells to monitor, sum and rate in order to determine the total battery capacity of local cell modules in a cost effect manner. The plurality of compensation cells 500 is paired with the local cell modules 300 to become the cell group with optimized total capacity. Voltage source V1 is electrically coupled to main cell 100. Similarly, Voltage source V2, voltage source V3 and voltage source V4 are electrically coupled to main cell 100. A method for actively balancing a cell group in a battery power system can be done with either static or dynamic pairing as noted below.

When cells in series are unbalanced, the weakest link in the series will trigger the protection mechanism that either stops charging or discharging altogether. This is because the weakest link will reach full charge or full discharge prematurely and the protection mechanism is triggered to protect other cells in the series from overcharging or over discharging respectively. The proposed invention supports both static pairing and dynamic pairing of compensation cells 501 with local cell modules 300.

A static pairing of compensation cells 501 with parallel cell module 300 aims to equalize the capacity of individual local cell modules 300 in the series such that they each have the same capacity. Strong compensation cells 501 are paired with weak local cell modules 300 for the duration of a single charge or discharge. Since each parallel cell module 300 has equivalent capacity, all modules in the series should reach full charge or full discharge synchronously. The system control unit 400 estimates the capacity of the compensation cells 501 and the local cell modules 300 and determines the pairing order.

Dynamic pairing involves reassigning compensation cells 501 to different local cell modules 300 throughout the duration of a single charge or discharge. Compensation cells 501 are assigned to a parallel cell module 300 for a given duration dictated by the system control unit 400. The system control unit 400 computes this duration based on the capacity of the parallel cell module 300. During charging, for instance, low capacity local cell modules 300 reaches full charge earlier than higher capacity local cell modules 300. By pairing one or more compensation cells 501 to it delays the parallel cell module 300 from reaching full charge early since charging current is proportionately divided between the compensation cell 501 and the parallel cell module 300. The system control unit 400 achieves optimal balance by delaying individual parallel cell module 300 relative to other local cell modules 300 in the appropriate amount such that all local cell modules 300 reach full charge or full discharge at the same time point. In essence, the compensation cells 501 serve as charge reservoirs that, when reassigned to different local cell modules 300, can be used to transport charge or divert charge to different local cell modules 300 in the series. The battery power system 10 may also be utilized in a manner that only a portion of the local cell modules 300 are driving the load. The active local cell modules 300 will deplete their energy store to the load while the inactive local cell modules 300 retain their charge. As charge transports, the compensation cells can be envisioned to move charge from the inactive local cell modules 300 to the active local cell modules, thereby, charging the active local cell modules 300 with energy stored in the inactive local cell modules 300.

As noted above, having the local cell modules in parallel allows for cell capacity balancing. Parallel cell module 300 provides the first level of cell balance with matched output voltage. Pairing those local cell modules 300 in main cell 100 and battery cell in compensation cell and power switch unit 500 provides the second level of balance. While each cell in main cell 100 has the same battery chemistry and same level cell capacity, the capacity each cell in the compensation cell & power switch unit 500 may have same or different capacity of that of Main cell 100. In either case, the chemistry of each cell in main cell 100 and each cell in power unit 500 is the same.

Compensation cell 501 requires a network of power MOSFET switches 501*a* . . . 501*f* to connect it to different parallel sections in the series. The network of power MOSFET switches 501*a* . . . 501*f* grows proportionally with the size of the series as well as the number of compensation cells 501. A cost effective solution may not implement a compensation cell 501 for each parallel cell module 300. Neither is the solution required to connect a compensation cell 501 to all the local cell modules 300 in the series. Reducing the amount of compensation cells 501 used and interconnects may reduce the balancing ability of the battery power system 10. A cost effective solution will implement only the necessary compensation cells 501 and interconnects that achieves the balancing ability required by the end application.

That which is claimed:

1. An apparatus for actively balancing a cell group in a battery power system, the apparatus comprising:
   a main cell unit further comprising a first cell unit serialized with a second cell unit;
   the first cell unit further comprises a first local cell module and a second local cell module in parallel creating a first parallel cell module;
   the second cell unit comprises a third local cell module and a fourth local cell module in parallel creating a second parallel cell module;
   the main cell unit is electrically coupled to a system control unit and the system control unit is communicatively coupled to the first local cell module, the second local cell module, the third local cell module and the fourth local cell module;
   a compensation cell unit and a power switch unit, are electrically connected in parallel to one another, electrically coupled in parallel to the main cell unit and electrically connected in parallel to the system control unit;
   wherein the compensation cell unit further comprises a plurality of compensation cells;
   wherein each of the plurality of compensation cells is paired with each of the parallel cell modules to become the cell group.

2. The apparatus of claim 1,
   each local cell module further comprises control circuitry that isolates the local cell module from the apparatus if the local cell module has excessive self-discharge indicative of a short circuitry path.

3. The apparatus of claim 1,
   each local cell module further comprises a temperature sensor that measures a temperature of the local cell module and communicates the temperature to the system control unit.

4. A method for actively balancing a cell group in a battery power system, the method comprising;
   forming a first cell unit by linking a first local cell module and a second local cell module in parallel thus creating a first parallel cell module;
   forming a second cell unit by linking a third local cell module and a fourth local cell module in parallel thus creating a second parallel cell module;
   forming a main cell unit by serializing a first cell unit with a second cell unit;
   coupling a system control unit to a main cell unit; wherein the system control unit is configured to communicate with the first local cell module, the second local cell module, the third local cell module and the fourth local cell module;
   coupling a compensation cell unit and a power switch unit in parallel to one another and further coupling in parallel to the main cell unit; wherein the compensation cell unit further comprises a plurality of compensation cells;
   rating the compensation cell and a total battery capacity of the main cell unit and storing this stored rating in the system control unit; and
   pairing each compensation cell with each local cell module based on the stored rating in the system control unit.

5. The method of claim 4,
   pairing strong compensation cells with weak local cell modules for a duration of a single charge or discharge; wherein in a first mode of operation, each local cell module has equivalent capacity, all local cell modules in series reach full charge or full discharge synchronously.

6. The method of claim 4,
   reassigning each compensation cell to different local cell modules throughout a duration of a single charge or discharge.

* * * * *